US012091987B2

(12) United States Patent
Senoo

(10) Patent No.: US 12,091,987 B2
(45) Date of Patent: Sep. 17, 2024

(54) STEAM TURBINE BLADE, STEAM TURBINE, AND METHOD FOR OPERATING SAME

(71) Applicant: Mitsubishi Power, Ltd., Yokohama (JP)

(72) Inventor: Shigeki Senoo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 175 days.

(21) Appl. No.: 17/440,007

(22) PCT Filed: Apr. 16, 2020

(86) PCT No.: PCT/JP2020/016675
§ 371 (c)(1),
(2) Date: Sep. 16, 2021

(87) PCT Pub. No.: WO2020/241106
PCT Pub. Date: Dec. 3, 2020

(65) Prior Publication Data
US 2022/0170372 A1 Jun. 2, 2022

(30) Foreign Application Priority Data
May 31, 2019 (JP) ................................ 2019-101997

(51) Int. Cl.
*F01D 5/18* (2006.01)
*F01D 21/10* (2006.01)
*F01D 21/12* (2006.01)

(52) U.S. Cl.
CPC ............... *F01D 5/18* (2013.01); *F01D 21/10* (2013.01); *F01D 21/12* (2013.01);
(Continued)

(58) Field of Classification Search
CPC .......... F01D 5/185; F01D 19/02; F01D 21/10; F01D 21/12; F01D 25/10; F05D 2260/608
See application file for complete search history.

(56) References Cited

U.S. PATENT DOCUMENTS 6,247,670 B1 * 6/2001 Eliahou-Niv ............ B64C 3/50
244/215
2006/0055742 A1 * 3/2006 Yokouchi ............ B41J 2/14233
347/68
(Continued)

FOREIGN PATENT DOCUMENTS

JP S50-125105 A 10/1975
JP S56-85503 A 7/1981
(Continued)

OTHER PUBLICATIONS

Yoshida et al. (JP-S63113101-A), (May 1998), English Translation (Year: 2023).*
(Continued)

*Primary Examiner* — J. Todd Newton
*Assistant Examiner* — Aye S Htay
(74) *Attorney, Agent, or Firm* — WHDA, LLP

(57) ABSTRACT

This steam turbine blade is provided with: a blade body (61) extending in a radial direction and having an airfoil profile in a cross section perpendicular to the radial direction; and a heater (H) including a heating wire disposed so as to extend along a trailing edge (Er) of the airfoil profile in the blade body (61). This configuration makes it possible to further mitigate an efficiency drop due to moisture attached to the surface of the steam turbine blade (60).

8 Claims, 6 Drawing Sheets

(52) U.S. Cl.
CPC .... *F05D 2220/31* (2013.01); *F05D 2260/608* (2013.01); *F05D 2270/301* (2013.01); *F05D 2270/303* (2013.01)

(56) References Cited

U.S. PATENT DOCUMENTS

| | | | | |
|---|---|---|---|---|
| 2008/0009742 | A1* | 1/2008 | Kondoh | B06B 1/0622 600/459 |
| 2011/0129343 | A1* | 6/2011 | Ebert | B29C 70/885 416/95 |
| 2016/0273517 | A1* | 9/2016 | Betran Palomas | F03D 1/0683 |
| 2020/0165920 | A1 | 5/2020 | Sasao et al. | |
| 2022/0018263 | A1* | 1/2022 | Seo | F01D 25/10 |

FOREIGN PATENT DOCUMENTS

| | | | | |
|---|---|---|---|---|
| JP | S61106901 | A | * | 5/1986 |
| JP | S63113101 | A | * | 5/1988 |
| JP | H06-8703 | U | | 2/1994 |
| JP | 2012-202314 | A | | 10/2012 |
| JP | 2013-119819 | A | | 6/2013 |
| JP | 2013-231394 | A | | 11/2013 |
| JP | 2014-40803 | A | | 3/2014 |
| JP | 5703082 | B2 | * | 4/2015 |
| JP | 2019-044723 | A | | 3/2019 |
| JP | 2019-44728 | A | | 3/2019 |
| WO | 2009-133146 | A1 | | 11/2009 |
| WO | 2019/049703 | A1 | | 3/2019 |

OTHER PUBLICATIONS

International Search Report dated Jun. 23, 2020, issued in counterpart Application No. PCT/JP2020/016675, with English translation. (6 pages).

Written Opinion dated Jun. 23, 2020, issued in counterpart Application No. PCT/JP2020/016675, with English translation. (11 pages).

* cited by examiner

STEAM TURBINE BLADE, STEAM TURBINE, AND METHOD FOR OPERATING SAME

TECHNICAL FIELD

The present invention relates to a steam turbine blade, a steam turbine, and a method for operating the same.

Priority is claimed on Japanese Patent Application No. 2019-101997 filed on May 31, 2019, the content of which is incorporated herein by reference.

BACKGROUND ART

There are cases where water droplets adhere to the surface of a stator vane of a steam turbine as steam flows. Such water droplets form a water film on the blade surface, and the water film is released into the steam from the trailing edge of the stator vane and is made finer and becomes enlarged liquid droplets in a high-speed steam environment. The enlarged liquid droplets flow downstream along with the flow of the steam. When a liquid droplet collides with a member on the downstream side (for example, a rotating blade), damage called erosion and a braking effect on the rotation of the rotating blade occur, and there is a possibility that a stable operation of the steam turbine may be hindered and that the efficiency of the steam turbine may decrease. As a technique for avoiding the generation of such liquid droplets (moisture), for example, a technique described in PTL 1 below is known. The apparatus described in PTL 1 is characterized in that the above-mentioned moisture is evaporated by heating a wide range of the pressure surface of a stator vane.

CITATION LIST

Patent Literature

[PTL 1] Japanese Patent No. 5703082

SUMMARY OF INVENTION

Technical Problem

However, the apparatus described in PTL 1 aims to completely evaporate the moisture by heating a wide range of the pressure surface. Therefore, the energy required for the heating becomes excessive. As a result, an improvement in the efficiency due to the removal of moisture is cancelled out by the energy required for the heating, and there is a possibility that the improvement in efficiency of the steam turbine as a whole may be limited.

The present invention has been made to solve the above problems, and an object thereof is to provide a steam turbine blade, a steam turbine, and a method for operating the same capable of further reducing a decrease in efficiency due to a liquid phase.

Solution to Problem

A steam turbine blade according to an aspect of the present invention includes: a blade body which extends in a radial direction and of which a cross-sectional shape orthogonal to the radial direction forms an airfoil; and a heater having a heating wire disposed so as to extend along a trailing edge of the airfoil in the blade body.

Here, during an operation of the steam turbine, fine water droplets adhere to the surface of the blade body. Such water droplets form a water film or water vein on the surface of the blade body. These water films or water veins move downstream (that is, toward a trailing edge side) along the flow of steam along the surface of the blade body. According to the above configuration, the heating wire is provided at the trailing edge where such a water film is concentrated. By energizing this heating wire, the water film is heated and completely evaporates, or at least a portion thereof evaporates. In a case where a portion of the water film evaporates, an explosion occurs inside the water film due to an effect of volume expansion caused by a phase change from the liquid phase to the gas phase, and the water film becomes finer due to the tearing caused by the explosion. In addition, a decrease in the surface tension of the water film due to the temperature rise due to the heating also contributes to the refinement of the water film. As the water film becomes finer or evaporates as described above, even if such a liquid film is blown downstream, damage or a braking effect on the structure on the downstream side can be minimized because the liquid film is fine. In addition, in the above configuration, even if the water droplets are not completely evaporated, the liquid film can be made finer by the partial evaporation effect of heating, so that the energy required for the heating can be reduced.

In the steam turbine blade, the blade body may be formed of a plate material in a curved state, the plate material may form the airfoil in a state in which a leading edge that is an end edge on a side opposite to the trailing edge is curved and in a state in which surfaces of the plate material facing each other abut each other on a trailing edge side, and the heating wire may be sandwiched between the surfaces facing each other.

According to the above configuration, the airfoil is formed by curving the plate material and causing the end surfaces on the trailing edge side to abut each other. Moreover, the heating wire is sandwiched between the surfaces that abut each other. Accordingly, the heating wire can be stably fixed, and the steam turbine blade can be obtained simply and inexpensively.

In the steam turbine blade, the blade body may have a first portion including a leading edge that is an end edge on a side opposite to the trailing edge, a second portion that includes the trailing edge and is provided with the heating wire, and a heat insulation and electrical insulation portion that is provided between the first portion and the second portion and thermally and electrically insulates the first portion and the second portion from each other.

According to the above configuration, the blade body has the first portion including the leading edge, the second portion including the trailing edge, and the heat insulation and electrical insulation portion disposed between the first portion and the second portion. The heating wire is provided in the second portion. Therefore, for example, by manufacturing the first portion in advance and thereafter attaching the second portion and the heat insulation and electrical insulation portion manufactured separately to the first portion, the steam turbine blade can be easily obtained. Furthermore, even in a steam turbine (steam turbine blade) provided in advance, by cutting off the trailing edge side of the blade body, attaching the heating wire, and thereafter attaching the trailing edge side to the first portion again, the steam turbine blade provided with the heating wire can be easily obtained.

In the steam turbine blade, in the blade body, an accommodating groove that extends along the trailing edge and is recessed toward a leading edge side that is an end edge on a side opposite to the trailing edge to accommodate the heating wire may be formed.

According to the above configuration, the accommodating groove that accommodates the heating wire is formed in the trailing edge. Accordingly, the heating wire can be attached to the blade body with a simpler and less expensive structure.

In the steam turbine blade, a plurality of concave portions that are arranged at intervals from an inner side toward an outer side in the radial direction and are recessed from the trailing edge toward a leading edge side may be formed in the trailing edge, and the heating wire may be disposed in a region corresponding to the plurality of concave portions.

According to the above configuration, the plurality of concave portions arranged at intervals in the radial direction are formed on the trailing edge. Each of the concave portions is recessed from the trailing edge toward the leading edge. In this configuration, the water film adhering to the blade body during the operation of the steam turbine flows toward the trailing edge side along the flow of the steam and is then captured in the concave portions. Since the heating wire is disposed in the concave portion, the captured water film can be efficiently heated. That is, since the region where the heating wires are disposed is smaller than that in a configuration in which the entire region of the trailing edge in an extension direction is heated, the energy required for the heating can be reduced.

In the steam turbine blade, the concave portion may be recessed in a shape of a curved surface from a trailing edge side toward the leading edge, and the heating wire may be curved along the curved surface.

According to the above configuration, the concave portion is recessed in the shape of the curved surface, and the heating wire is curved along the curved surface. Accordingly, heat can be efficiently applied to the water film captured in the concave portion. As a result, the water film can be made finer with less energy.

In the steam turbine blade, at least a portion of the heating wire may be exposed from a bottom surface of the concave portion.

According to the above configuration, since the portion of the heating wire is exposed from the bottom surface of the concave portion, heat can be directly applied to the water film captured in the concave portion. As a result, the refinement of the water film can be further promoted.

A steam turbine according to another aspect of the present invention includes: a rotating shaft that rotates around an axis; a plurality of rotating blades that extend outward in a radial direction from an outer peripheral surface of the rotating shaft and are arranged at intervals in a circumferential direction; a casing that covers the plurality of rotating blades from an outer peripheral side; and the steam turbine blade according to any one of the aspects that is provided on an inner peripheral surface of the casing and is disposed adjacent to the rotating blade in a direction of the axis as a stator vane.

According to the above configuration, it is possible to obtain a steam turbine with higher efficiency by suppressing the generation of a water film.

A method for operating a steam turbine according to another aspect of the present invention is a method for operating the steam turbine according to any one of the aspects, including: a first heating step of heating the trailing edge to a predetermined first temperature by the heating wire; a start-up step of starting up the steam turbine; and a second heating step of heating the trailing edge at a second temperature that is a temperature lower than the first temperature after the start-up step is completed and the steam turbine enters a steady state.

Here, in a state before the start-up of the steam turbine (room temperature state), it is considered that the temperatures of the steam turbine blade and the rotating blade of the steam turbine are significantly lower than the temperature of the steam. Therefore, at the time of start-up, the steam is likely to form a water film on the steam turbine blade. In the above operation method, by performing the first heating step prior to the start-up of the steam turbine (start-up step), the trailing edge of the blade body is heated in advance to the first temperature by the heating wire. Thereafter, when the steam turbine enters a steady state, the trailing edge is continuously heated at the second temperature lower than the first temperature. In other words, the first temperature is a temperature higher than the second temperature. Therefore, by setting the blade body to a relatively high temperature state prior to the start-up, the generation of the water film described above can be effectively suppressed.

In the method for operating the steam turbine, the second heating step may include a static pressure measurement step of measuring a static pressure on an inner peripheral surface of the casing downstream of the trailing edge, a saturation temperature calculation step of calculating a saturation temperature of steam based on the static pressure, and a temperature setting step of setting the second temperature as a temperature higher than the saturation temperature.

According to the above method, the saturation temperature of the steam is calculated based on the static pressure on the inner peripheral surface of the casing measured downstream of the trailing edge, and a temperature higher than the saturation temperature is set as the second temperature. The measurement of the static pressure is easier and more accurate than the measurement of other physical quantities. Therefore, according to the above method, the second temperature can be set more easily and accurately. As a result, the probability of enlarged water droplets being generated from the trailing edge of the blade body can be further reduced.

Advantageous Effects of Invention

According to the present invention, it is possible to provide a steam turbine blade, a steam turbine, and a method for operating the same capable of further reducing a decrease in efficiency due to moisture.

DESCRIPTION OF EMBODIMENTS

Figure 1:
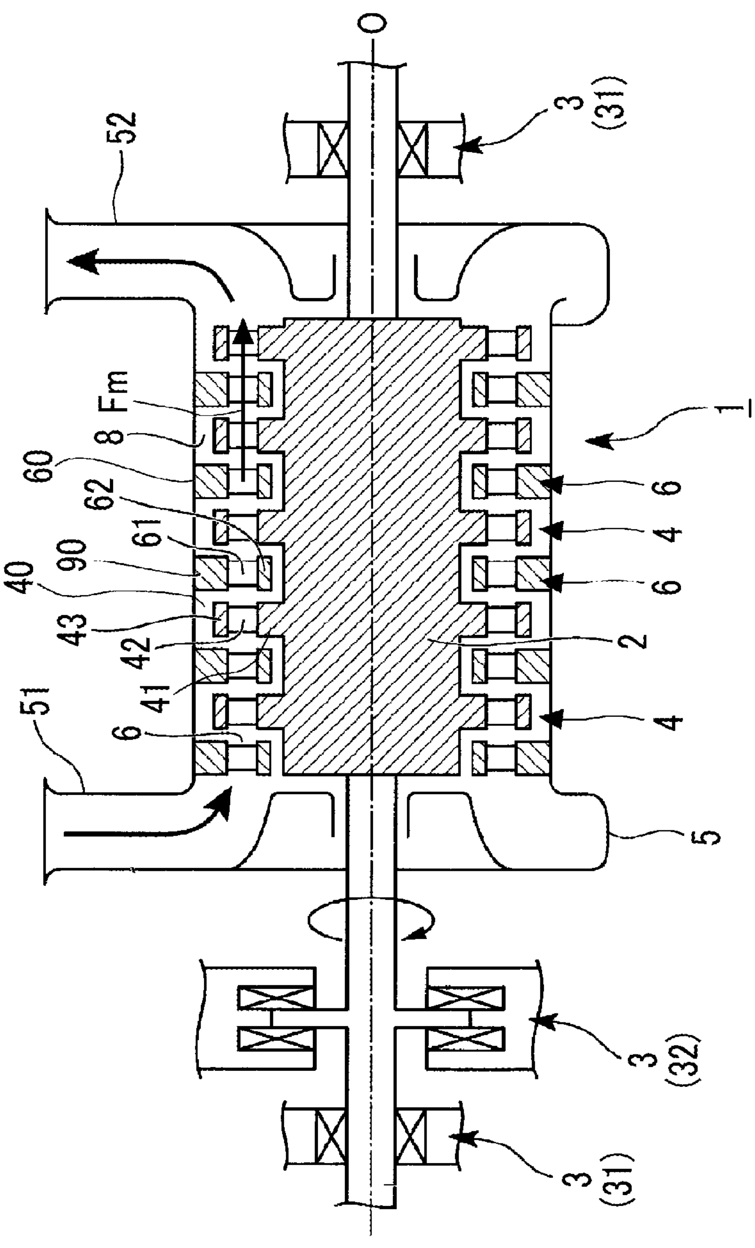
FIG. 1 is a schematic view showing a configuration of a steam turbine according to an embodiment of the present invention.

Next, an embodiment of the present invention will be described with reference to FIGS. 1 to 4. A steam turbine 1 according to the present embodiment includes a rotating shaft 2, a bearing device 3, a plurality of rotating blade sections 4, a casing 5, and a plurality of stator vane sections 6. The rotating shaft 2 has a columnar shape extending along an axis O, and can rotate around the axis O. The bearing device 3 supports the shaft end of the rotating shaft 2. The bearing device 3 has a pair of journal bearings 31 and only one thrust bearing 32. The pair of journal bearings 31 are respectively provided at both end portions of the rotating shaft 2 in an axis O direction. Each of the journal bearings 31 supports a radial load with respect to the axis O. The thrust bearing 32 is provided on only one side in the axis O direction. The thrust bearing 32 supports a load in the axis O direction. The plurality of rotating blade sections 4 arranged at intervals in the axis O direction are provided on the outer peripheral surface of the rotating shaft 2. Each of the rotating blade sections 4 has a plurality of rotating blades 40 arranged at intervals in a circumferential direction with respect to the axis O. The rotating blade 40 has a rotating blade platform 41, a rotating blade body 42, and a rotating blade shroud 43 (shroud). The rotating blade platform 41 protrudes radially outward from the outer peripheral surface of the rotating shaft 2. The rotating blade body 42 is attached to the outer peripheral surface of the rotating blade platform 41. The rotating blade body 42 extends in a radial direction, and the cross-sectional shape thereof orthogonal to the radial direction forms an airfoil. The rotating blade shroud 43 is attached to the outer end portion of the rotating blade body 42 in the radial direction.

The rotating shaft 2 and the rotating blade sections 4 (rotating blades 40) are surrounded by the casing 5 from the outer peripheral side. The casing 5 has a tubular shape centered on the axis O. The plurality of stator vane sections 6 arranged at intervals in the axis O direction are provided on the inner peripheral surface of the casing 5. These stator vane sections 6 are arranged alternately with the above-mentioned rotating blade sections 4 in the axis O direction. Each of the stator vane sections 6 has a plurality of stator vanes 60 arranged at intervals in the circumferential direction with respect to the axis O. The stator vane 60 has a stator vane body 61, a stator vane shroud 62, a static pressure sensor Sp, a heater H (see FIG. 2) described later, and a control device 100 that controls the behavior of the heater H. The stator vane body 61 is attached to a stator vane support portion 90 on the inner peripheral surface of the casing 5. The stator vane body 61 extends in the radial direction from the inner peripheral surface of the stator vane support portion 90, and has an airfoil cross-sectional shape when viewed in the radial direction. The stator vane shroud 62 is attached to the inner end portion of the stator vane body 61 in the radial direction. The cavity 8 that is recessed outward in the radial direction from the inner peripheral surface of the casing 5 is formed between a pair of the stator vanes 60 adjacent to each other on the inner peripheral surface of the casing 5. The above-mentioned rotating blade shroud 43 is accommodated in the cavity 8. The rotating blades 40 and the stator vanes 60 may be collectively referred to as steam turbine blades.

A suction port 51 through which high-temperature and high-pressure steam supplied from the outside is introduced is formed at an end portion of the casing 5 on one side in the axis O direction. A discharge port 52 through which the steam that has passed through the casing 5 is discharged is formed at an end portion of the casing 5 on the other side in the axis O direction. The steam introduced from the suction port 51 alternately collides with the plurality of rotating blade sections 4 (rotating blades 40) and the plurality of stator vane sections 6 (stator vanes 60) while passing through the inside of the casing 5 from one side toward the other side in the axis O direction. Accordingly, rotational energy is applied to the rotating shaft 2. The rotation of the rotating shaft 2 is extracted from the shaft end and used, for example, for driving a generator (not shown) or the like. In the following description, the flow of steam flowing in the casing 5 from one side toward the other side in the axis O direction is called a main flow Fm. Furthermore, the side from which the main flow Fm flows (one side in the axis O direction) is called an upstream side, and the side to which the main flow Fm flows (the other side in the axis O direction) is called a downstream side.

Figure 2:
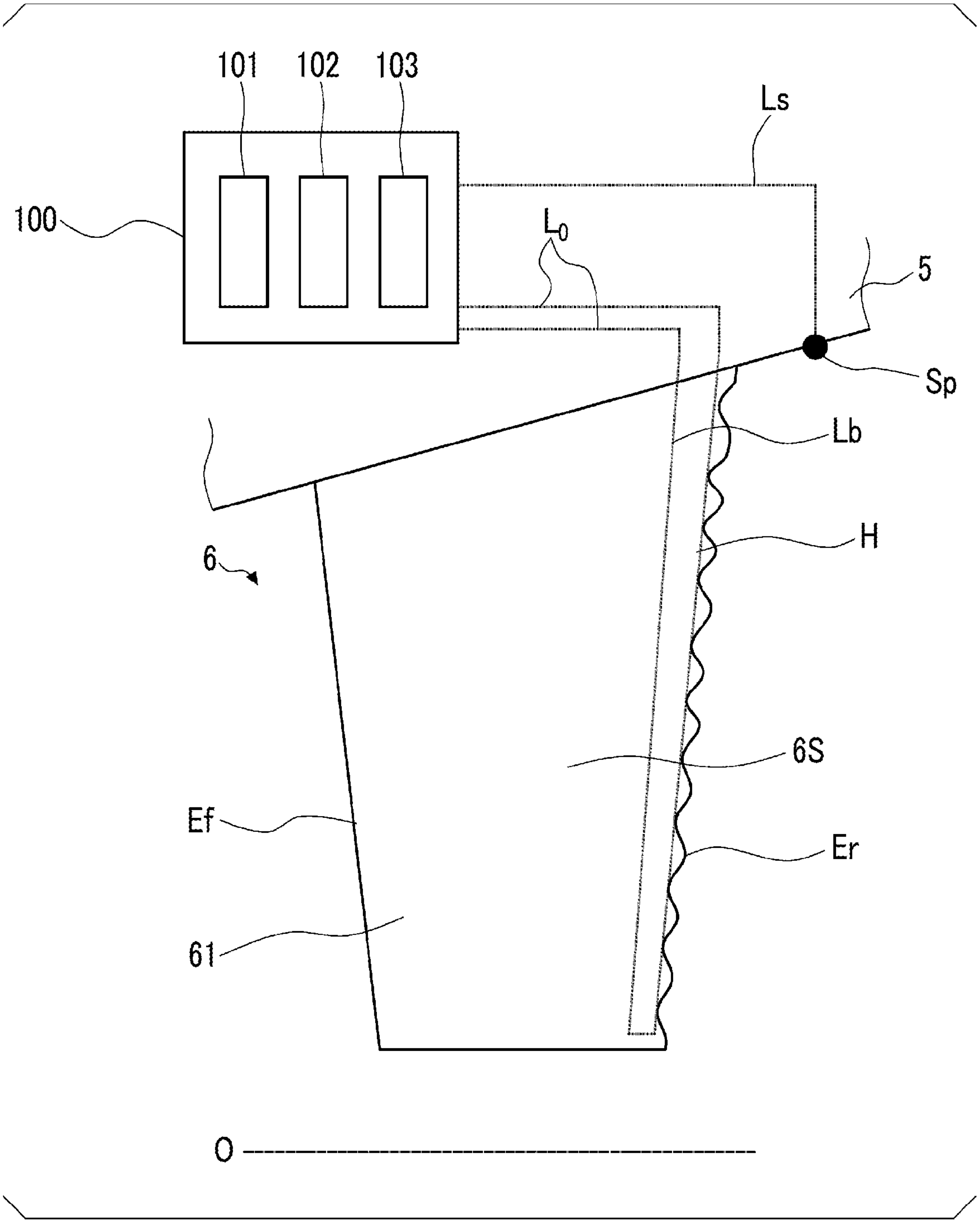
FIG. 2 is a side view showing a configuration of a steam turbine blade according to the embodiment of the present invention.

Next, the configuration of the stator vane 60 will be described in detail with reference to FIG. 2. As shown in the figure, the stator vane body 61 is formed by a leading edge Ef facing the one side (upstream side) in the axis O direction, a trailing edge Er facing the other side (downstream side) in the axis O direction, a pressure surface 6S extending from the leading edge Ef to the trailing edge Er, and a suction surface (not shown) facing the opposite side of the pressure surface 6S. In an example of FIG. 2, the stator vane body 61 has a configuration in which the chord length (the dimension from the leading edge Ef to the trailing edge Er) gradually increases from the inner side to the outer side in the radial direction. However, the shape of the stator vane body 61 is not limited to the above shape, and can be appropriately changed according to the design and specifications.

The heater H is embedded in an inner portion of the stator vane body 61 close to the trailing edge Er. The heater H generates heat due to internal resistance when energized from the outside. An outer end portion of the heater H in the radial direction is connected to the control device 100 via a lead wire $L_0$. Furthermore, the heater H is embedded in an inner portion of the stator vane body 61 from the outer end surface of the stator vane body 61 in the radial direction toward the radially inner side. A negative electrode wire Lb for returning current to the control device 100 is connected to the inner end portion of the heater H in the radial direction. The negative electrode wire Lb is also embedded in the inner portion of the stator vane body 61 as in the heater H. As will be described in detail later, the heater H applies, to the surface of the trailing edge Er, an amount of heat capable of heating water droplets (liquid droplets) adhering to the surface and evaporating at least a portion thereof. In other words, the heater H is embedded in the inner portion of the stator vane body 61 in a state of being close to the trailing edge Er by a distance at which such an amount of heat can be transferred to the surface of the trailing edge Er.

A static pressure sensor Sp for detecting the static pressure of the steam (main flow Fm) is attached to a position downstream of the trailing edge Er on the inner peripheral surface of the casing 5 (that is, a position that is close to the trailing edge Er on the inner peripheral surface of the casing 5 and that is not affected by the static pressure distribution (pressure gradient) generated on the pressure surface 6S). The static pressure sensor Sp sends the detected static pressure value as an electrical signal to the control device 100 through the signal line Ls. As the static pressure sensor Sp, it is possible to use one appropriately selected from various commercially available types.

Here, it is known that the distortion of the static pressure distribution in the circumferential direction on the pressure surface 6S is relatively small. Therefore, it is sufficient that the static pressure sensor Sp is provided at at least one location in the circumferential direction. That is, the static pressure sensor Sp does not necessarily have to be provided for each stator vane 60. On the other hand, in consideration of redundancy for preparing for a malfunction, it is desirable that four static pressure sensors Sp are provided in the circumferential direction. In this case, it is desirable to provide static pressure sensors Sp respectively at two locations in a horizontal direction and at two locations in an up-down direction in the casing 5. Accordingly, a reduction in the number of necessary components and a reduction in the number of processes can be achieved. In addition, since a perforating process (a process for embedding the static pressure sensor Sp) to be performed on the casing 5 is reduced, the risk of occurrence of a defect due to the formation of a hole can be suppressed.

The control device 100 calculates, based on the static pressure value received from the static pressure sensor Sp, a saturation temperature under the static pressure value state, and changes the output of the heater H so that the water droplets adhering to the stator vane body 61 are heated up to the saturation temperature or higher. Specifically, the control device 100 includes a current supply unit 101, a temperature calculation unit 102, and a temperature setting unit 103. The current supply unit 101 supplies a current to the heater H through the lead wire $L_0$. The temperature calculation unit 102 calculates the saturation temperature of water under the static pressure value based on the static pressure value detected by the static pressure sensor Sp. In performing such a calculation, a method using a table showing the relationship between the saturation temperature and the static pressure stored in advance in the temperature calculation unit 102 is used as an example. The temperature setting unit 103 sets and calculates a temperature higher than the saturation temperature value calculated by the temperature calculation unit 102 by a predetermined value as a heating target temperature by the heater H. The current supply unit 101 supplies a current necessary for the heater H to satisfy the heating target temperature.

Figure 3:
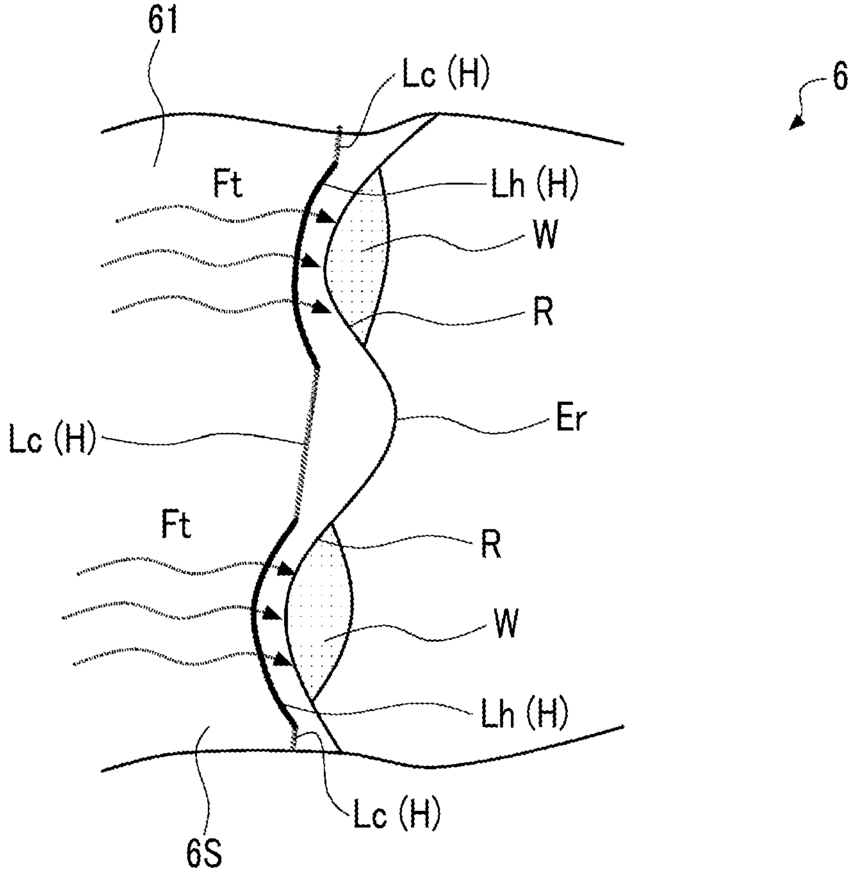
FIG. 3 is an enlarged view of a main part of the steam turbine blade according to the embodiment of the present invention.

Next, the configuration of the trailing edge Er of the stator vane body 61 and the configuration of the heater H will be described in detail with reference to FIG. 3. As shown in the figure, a plurality of concave portions R arranged at intervals in the radial direction are formed on the trailing edge Er. As will be described in detail later, these concave portions R are formed, in a case where fine water droplets adhering to the surface of the stator vane body 61 become pulsating flows Ft and flow to the downstream side, to capture and retain these water droplets as water droplets (liquid droplets) W. Each of the concave portions R is recessed in a curved surface shape from the trailing edge Er toward the leading edge Ef side. That is, the trailing edge Er has a wave shape when viewed in the circumferential direction because such concave portions R are continuously provided. The end edges of each of the concave portions R in the radial direction are connected to the trailing edge Er in a smooth curved surface shape.

The heater H has a plurality of heating wires Lh disposed in portions corresponding to the concave portions R in the inner portion of the stator vane body 61, and connecting wires Lc for connecting adjacent heating wires Lh to each other. The heating wire Lh is curved from the trailing edge Er side toward the leading edge Ef side along the curved shape of the concave portion R. That is, the heating wire Lh is equidistant from the surface of the concave portion R over the entire length. This makes it possible to evenly apply heat to the surface of the concave portion R from the heating wire Lh. Specifically, as the heating wire Lh, a wire rod in which a metal wire that produces relatively high internal resistance is used as a core wire and the periphery of the core wire is covered with an insulating film is suitably used. Examples of this type of wire rod include a sheath heater (registered trademark). The sheath heater (registered trademark) is obtained by covering the periphery of a nichrome wire with a powder of magnesia, which is an insulator. In a case where the stator vane body 61 is formed of a metallic material, by performing such an insulation treatment, it is possible to prevent the diffusion of current while securing a heat propagation path. Furthermore, as a form of heating by the heating wire Lh, it is also possible to use high frequency induction heating in addition to the internal resistance as described above.

Figure 4:
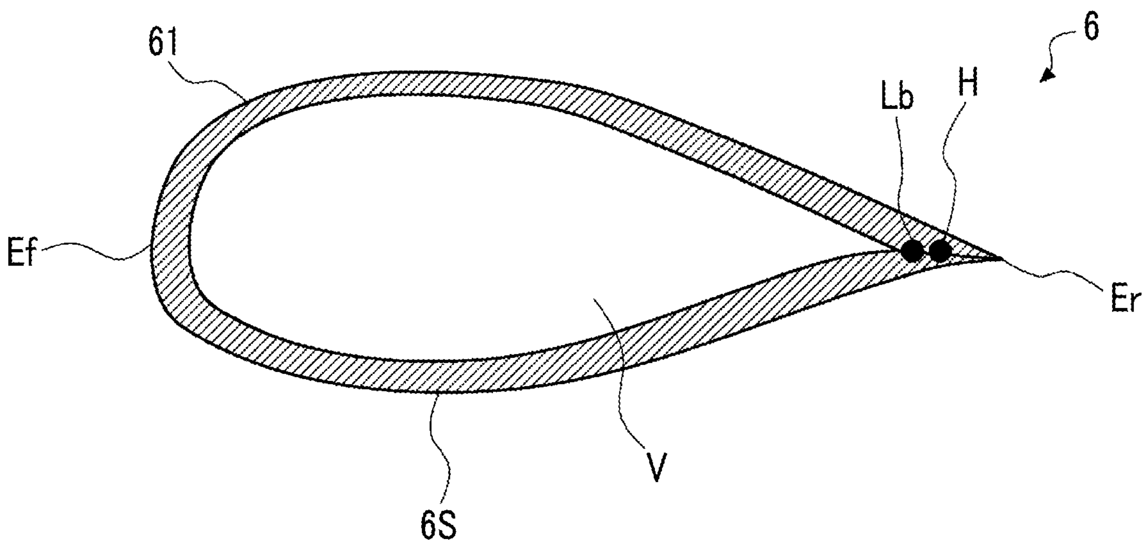
FIG. 4 is a cross-sectional view showing the configuration of the steam turbine blade according to the embodiment of the present invention.

Next, an example of a method for manufacturing the above-mentioned stator vane 60 will be described with reference to FIG. 4. As shown in the figure, in obtaining the stator vane 60 having the heater H embedded therein, a step of curving one sheet of plate material to form the leading edge Ef and abutting and fixing surfaces that face each other when curved to form the trailing edge Er is considered as an example. Inside the stator vane 60, a space as a hollow portion V is formed. A cooling device (not shown) or the like may be embedded in the space. In the stator vane body 61 configured as described above, the heater H can be firmly and stably embedded by sandwiching the heater H between the surfaces forming the trailing edge Er. In other words, according to such a method, it is possible to obtain the stator vane 60 having the heater H easily and at low cost without a complex process such as inserting the heater H into a hole.

Subsequently, a method for operating the steam turbine 1 according to the present embodiment will be described. In operating the steam turbine 1, first, high-temperature and high-pressure steam is guided into the casing 5 from an external supply source (boiler or the like). The steam introduced into the casing 5 alternately collides with the stator vanes 60 and the rotating blades 40 to apply a rotational force to the rotating shaft 2 via the rotating blades 40. The energy of the rotating shaft 2 is used to drive an external device such as a generator connected to the shaft end. Here, as the steam flows in the casing 5 from the upstream side to the downstream side, the pressure and temperature gradually decrease. In particular, as the temperature decreases, fine water droplets adhere onto the surface of the stator vanes 60 (stator vane body 61) and are collected, whereby a water film is formed. This water film is released into the steam again and splits into relatively large liquid droplets called enlarged liquid droplets. Enlarged liquid droplets may be blown downstream by being exposed to a flow of the steam. As a result, such liquid droplets may collide with the rotating blade 40 rotating at a high speed, causing erosion on the surface of the rotating blade 40 or acting as a brake against the rotation of the rotating blade 40. Therefore, it is desirable to remove the water film as described above as much as possible.

Therefore, in the present embodiment, by providing the heater H in the trailing edge Er of the stator vane body 61, fine water droplets are heated to evaporate at least a portion thereof or to further make the fine water droplets finer. More specifically, the above-mentioned control device 100 detects the static pressure on the surface (pressure surface 6S) of the stator vane body 61, and calculates the saturation temperature of water under the static pressure from the static pressure value. Furthermore, the control device 100 sets a temperature higher than the saturation temperature by a predetermined value as the heating target temperature. The temperature setting unit 103 included in the control device 100 supplies the heater H with a current sufficient to realize the heating target temperature. In the heater H, heat is generated by this current and internal resistance, and the water droplets W staying in the concave portion R at the trailing edge Er are heated. At least a portion of the heated water droplets W evaporates, or becomes finer liquid droplets due to tearing caused by an explosion occurring inside the water droplets W.

Figure 5:
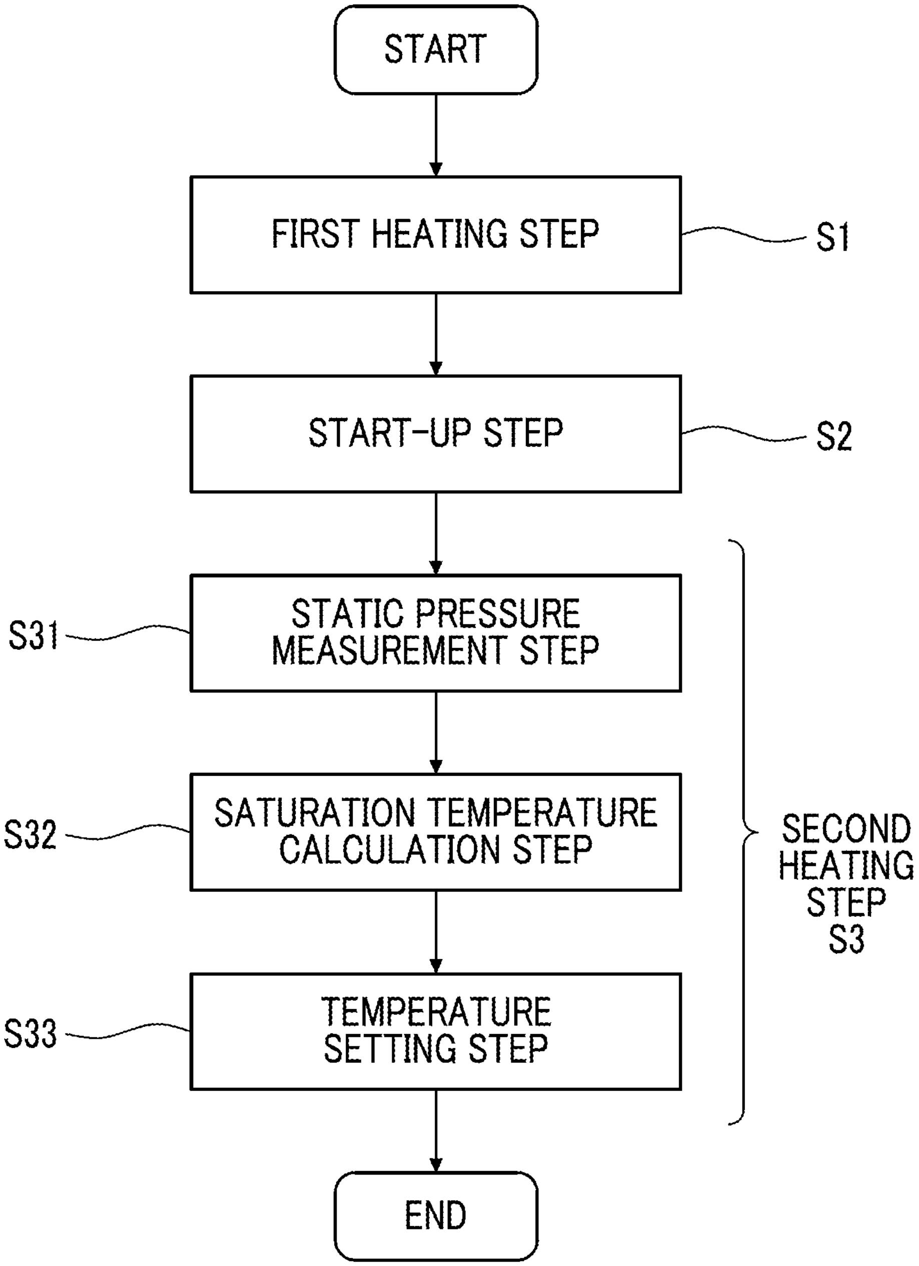
FIG. 5 is a flowchart showing a method for operating the steam turbine according to the embodiment of the present invention.

In particular, when the steam turbine 1 is started up in a room temperature state, the following operation method is adopted. As shown in FIG. 5, this operation method includes a first heating step S1, a start-up step S2, and a second heating step S3. In the first heating step S1, heat is applied to the stator vane body 61 of the steam turbine in a cold state (a state in which the temperature is relatively low) by the heater H until a predetermined temperature (first temperature) is reached. Accordingly, the trailing edge Er of the stator vane body 61 becomes the first temperature, which is a temperature higher than in the cold state. In this state, the steam turbine 1 is started up (start-up step S2). Here, in a case where the stator vane body 61 is not subjected to any treatment such as heating, water droplets may be generated on the surface of the stator vane body 61 due to the temperature difference between the stator vane body 61 that is in a state at a temperature lower than that of the steam, and the steam. However, by heating the stator vane body 61 with the heater H in advance as described above, the temperature difference described above decreases, and water droplets are less likely to be generated.

Furthermore, after the start-up step S2 is completed and the steam turbine 1 enters a steady state, the second heating step S3 is performed. The second heating step S3 includes a static pressure measurement step S31, a saturation temperature calculation step S32, and a temperature setting step S33. In the static pressure measurement step S31, the static pressure of the pressure surface 6S is measured by the static pressure sensor Sp described above. Thereafter, the control device 100 calculates the saturation temperature based on the static pressure value (saturation temperature calculation step S32), and sets a second temperature that is lower than the saturation temperature as the heating target temperature by the heater H (temperature setting step S33). In this state, the steam turbine 1 is continuously operated.

As described above, the steam turbine 1 according to the present embodiment can be operated more stably by suppressing the generation of water droplets. Here, during the operation of the steam turbine 1, fine water droplets adhere to the surface of the stator vane body 61. Such water droplets form a water film or water vein on the surface of the stator vane body 61. These water films or water veins move downstream (that is, toward the trailing edge side) along the flow of the steam on the surface of the stator vane body 61 as the pulsating flows Ft. According to the above configuration, the heating wire Lh is provided at the trailing edge where such a water film is concentrated. By energizing this heating wire, the water film is heated and completely evaporates, or at least a portion thereof evaporates. In a case where a portion of the water film evaporates, an explosion occurs inside the water film due to an effect of volume expansion caused by a phase change from the liquid phase to the gas phase, and the water film becomes finer due to the tearing caused by the explosion. In addition, a decrease in the surface tension of the water film due to the temperature rise due to the heating also contributes to the refinement of the water film. As the water film becomes finer or evaporates as described above, even if such a liquid film is blown downstream, damage or a braking effect on the structure on the downstream side can be minimized because the liquid film is fine. In addition, in the above configuration, even if the water droplets are not completely evaporated, the liquid film can be made finer by the partial evaporation effect of heating, so that the energy required for the heating can be reduced.

Furthermore, according to the above configuration, the airfoil of the stator vane body 61 is formed by curving the plate material and causing the end surfaces on the trailing edge Er side to abut each other. Moreover, the heating wire Lh is sandwiched between the surfaces that face and abut each other. Accordingly, the heating wire Lh can be stably fixed, and the stator vane 60 can be obtained simply and inexpensively.

In addition, according to the above configuration, the plurality of concave portions R arranged at intervals in the radial direction are formed on the trailing edge Er. Each of the concave portions R is recessed from the trailing edge Er toward the leading edge Ef. In this configuration, the water droplets adhering to the stator vane body 61 during the operation of the steam turbine 1 flow toward the trailing edge Er side along the flow of the steam and are then captured in the concave portions R. Since the heating wires Lh are disposed in the concave portions R, the captured water droplets can be efficiently heated. That is, since the region where the heating wires Lh are disposed is smaller than that in a configuration in which the entire region of the trailing edge Er in an extension direction is heated, the energy required for the heating can be reduced.

Furthermore, according to the above configuration, the concave portion R is recessed in a curved surface shape, and the heating wire Lh is curved along the curved surface. Accordingly, heat can be efficiently applied to the water droplets captured in the concave portions R. As a result, water droplets can be made finer with less energy.

Here, in a state before the start-up of the steam turbine 1 (cold state), it is considered that the temperatures of the stator vanes 60 and the rotating blades 40 are significantly lower than the temperature of the steam. Therefore, at the time of start-up, the steam is likely to adhere to the stator vanes 60. In the above operation method, by performing the first heating step S1 prior to the start-up of the steam turbine 1 (start-up step S2), the trailing edge Er of the stator vane body 61 is heated in advance to the first temperature by the heating wires Lh. Thereafter, when the steam turbine enters a steady state, the trailing edge Er is continuously heated at the second temperature lower than the first temperature. In other words, the first temperature is a temperature higher than the second temperature. Therefore, by setting the stator vane body 61 to a relatively high temperature state prior to the start-up, the generation of the water film described above can be effectively suppressed.

Furthermore, according to the above method, the saturation temperature of the steam is calculated based on the static pressure on the inner peripheral surface of the casing 5 downstream of the trailing edge Er, and a temperature higher than the saturation temperature is set as the second temperature. The measurement of the static pressure is easier and more accurate than the measurement of other physical quantities. Therefore, according to the above method, the second temperature can be set more easily and accurately. As a result, the probability of water droplets growing on the surface of the stator vane body 61 can be further reduced.

Figure 6:
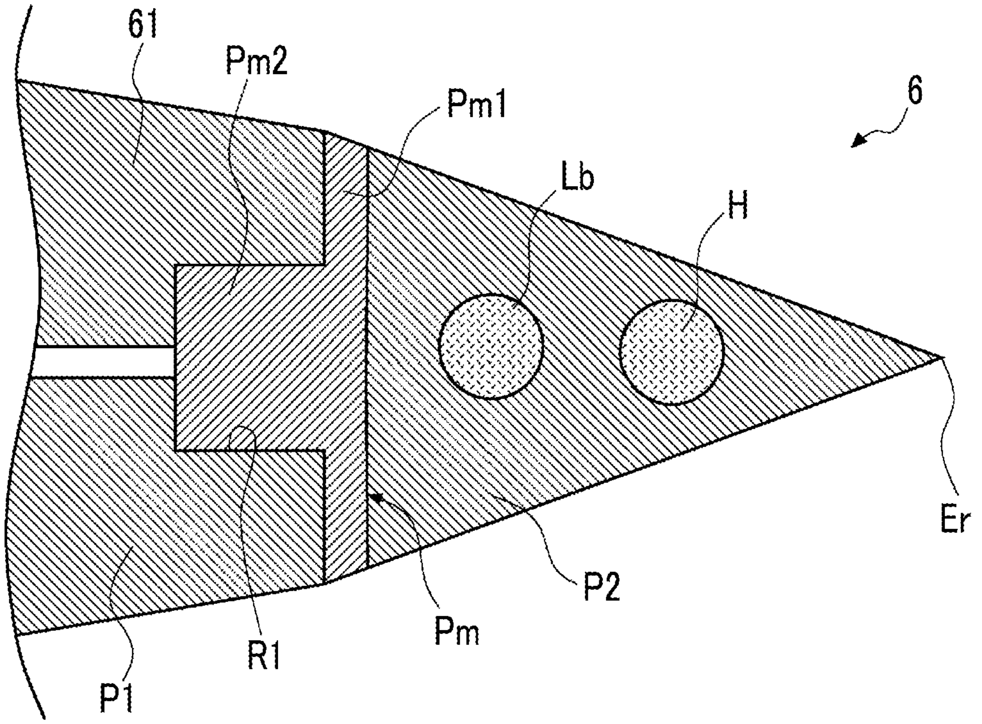
FIG. 6 is a cross-sectional view showing a modification example of the steam turbine blade according to the embodiment of the present invention.

The embodiment of the present invention has been described above. In addition, various changes and modifications of the above-described configuration can be made without departing from the gist of the present invention. For example, in obtaining the stator vane body 61, it is possible to adopt configurations shown in FIGS. 6 to 8 instead of the configuration described in the above embodiment. In the example of FIG. 6, the stator vane body 61 has a first portion P1 including the leading edge Ef side, a second portion P2 including the trailing edge Er side, and a heat insulation and electrical insulation portion Pm provided between the first portion P1 and the second portion P2. An engaging groove R1 that is rectangularly recessed toward the leading edge Ef side is formed on the end edge of the first portion P1 on the trailing edge Er side. The heat insulation and electrical insulation portion Pm has a plate-shaped portion Pm1 connected to the second portion P2 and an engaging protrusion Pm2 that protrudes from the leading edge Ef side of the plate-shaped portion Pm1 and is engaged with the engaging groove R1. The second portion P2 has the heater H and the negative electrode wire Lb described above embedded therein. The heat insulation and electrical insulation portion Pm is interposed between the first portion P1 and the second portion P2 to thermally and electrically insulate the two portions from each other.

According to the above configuration, for example, by manufacturing the first portion P1 in advance and thereafter attaching the second portion P2 and the heat insulation and electrical insulation portion Pm manufactured separately to the first portion P1, the stator vane 60 can be easily obtained. Furthermore, even in the steam turbine 1 provided in advance, by cutting off the trailing edge Er side of the stator vane body 61, attaching the heater H and the like to the cut-off portion, and thereafter attaching the cut-off portion to the first portion P1 again, the stator vane 60 provided with the heater H can be easily obtained.

Figure 7:
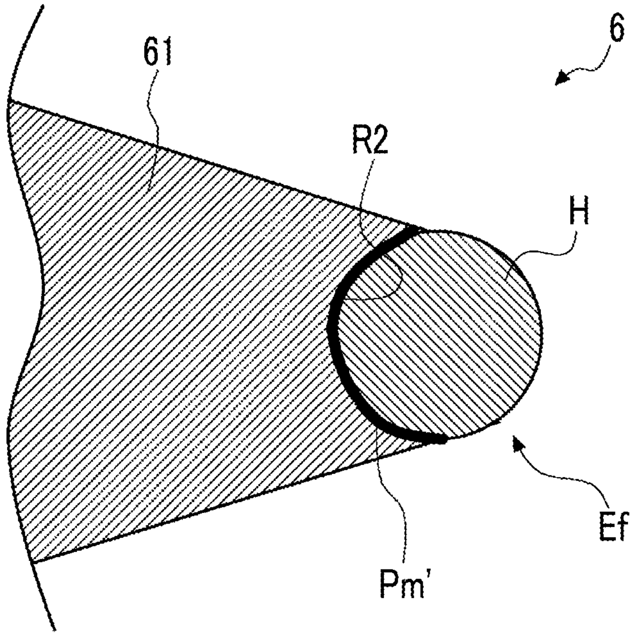
FIG. 7 is a cross-sectional view showing another modification example of the steam turbine blade according to the embodiment of the present invention.

In addition, in an example of FIG. 7, in the stator vane body 61, an accommodating groove R2 that extends along the trailing edge Er and is recessed toward the leading edge Ef side to accommodate the heater H is formed. Furthermore, a heat insulation and electrical insulation portion Pm' is interposed between the inner surface of the accommodating groove R2 and the heater H. According to this configuration, the heater H can be attached to the stator vane body 61 with a simpler and less expensive structure.

Figure 8:
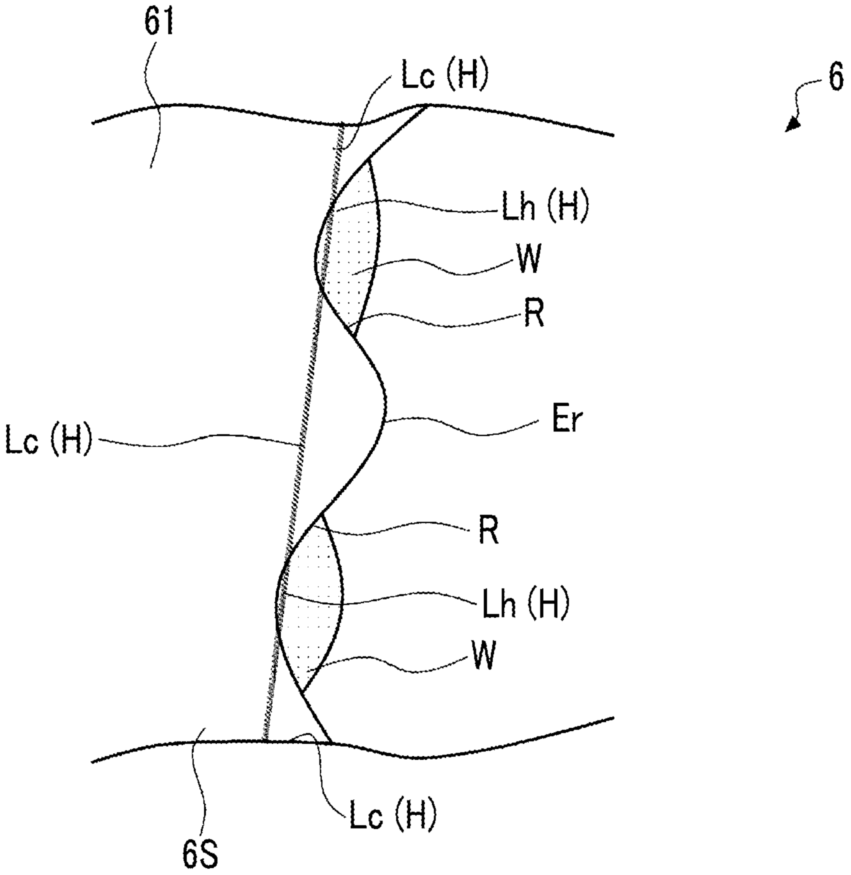
FIG. 8 is a cross-sectional view showing still another modification example of the steam turbine blade according to the embodiment of the present invention.

In an example of FIG. 8, a configuration is adopted in which at least a portion of the heater H is the heating wire Lh, and the heating wire Lh is exposed from the bottom surface of the concave portion R formed on the trailing edge Er. According to the above configuration, since the heating wire Lh is exposed from the bottom surface of the concave portion R, heat can be directly applied to the water droplet W captured in the concave portion R. As a result, the refinement or partial evaporation of the water droplets W can be further promoted.

INDUSTRIAL APPLICABILITY

According to the present invention, it is possible to provide a steam turbine blade, a steam turbine, and a method for operating the same capable of further reducing a decrease in efficiency due to moisture.

REFERENCE SIGNS LIST

1: Steam turbine
2: Rotating shaft
3: Bearing device
4: Rotating blade section
5: Casing
6: Stator vane section
7: Fin
8: Cavity
31: Journal bearing
32: Thrust bearing
40: Rotating blade
41: Rotating blade platform
42: Rotating blade body
43: Rotating blade shroud
51: Suction port
52: Discharge port
60: Stator vane
61: Stator vane body
62: Stator vane shroud
6S: Pressure surface
90: Stator vane support portion
100: Control device
101: Current supply unit
102: Temperature calculation unit
103: Temperature setting unit
Ef: Leading edge
Er: Trailing edge
Fm: Main flow
Ft: Pulsating flow
H: Heater
$L_0$: Lead wire
Lb: Negative electrode wire
Lc: Connecting wire
Lh: Heating wire
Ls: Signal line
O: Axis
P1: First portion
P2: Second portion
Pm, Pm': Heat insulation and electrical insulation portion
Pm1: Plate-shaped portion
Pm2: Engaging protrusion
R: Concave portion
R1: Engaging groove
R2: Accommodating groove
Sp: Static pressure sensor
V: Hollow portion
W: Water droplet

The invention claimed is:

1. A steam turbine blade comprising:

a stator vane body which extends in a radial direction and of which a cross-sectional shape orthogonal to the radial direction forms an airfoil; and a heater having a heating wire disposed so as to extend along a trailing edge of the airfoil in the stator vane body, wherein the stator vane body is formed of a plate material in a curved state, the plate material forms the airfoil in which a leading edge that is an end edge on a side opposite to the trailing edge is curved and in which surfaces of the plate material facing each other about each other on a trailing edge side, the heating wire is sandwiched between the surfaces facing each other, the heating wire is embedded so as not to protrude from the surfaces, the heater evaporates at least a portion of water droplets adhering to a surface of the stator vane body, and the heating wire extends in the radial direction.

2. The steam turbine blade according to claim 1, wherein a plurality of concave portions that are arranged at intervals from an inner side to an outer side in the radial direction and are recessed from the trailing edge toward a leading edge side are formed on the trailing edge, and the heating wire is disposed in a region corresponding to the plurality of concave portions.

3. The steam turbine blade according to claim 2, wherein the plurality of concave portions are recessed in a shape of a curved surface from a trailing edge side toward the leading edge, and the heating wire is curved along the curved surface.

4. The steam turbine blade according to claim 2, wherein at least a portion of the heating wire is exposed from a bottom surface of the plurality of concave portions.

5. A steam turbine comprising:

a rotating shaft that rotates around an axis;

a plurality of rotating blades that extend outward in a radial direction from an outer peripheral surface of the rotating shaft and are arranged at intervals in a circumferential direction;

a casing that covers the plurality of rotating blades from an outer peripheral side; and the steam turbine blade according to claim 1 that is provided on an inner peripheral surface of the casing and is disposed adjacent to the rotating blade in a direction of the axis as a stator vane.

6. A method for operating the steam turbine according to claim 5, the method comprising:

a first heating step of heating the trailing edge to a predetermined first temperature by the heating wire;

a start-up step of starting up the steam turbine; and a second heating step of heating the trailing edge at a second temperature that is a temperature lower than the first temperature after the start-up step is completed and the steam turbine enters a steady state.

7. The method for operating the steam turbine according to claim 6, wherein the second heating step includes a static pressure measurement step of measuring a static pressure on an inner peripheral surface of the casing downstream of the trailing edge, a saturation temperature calculation step of calculating a saturation temperature of steam based on the static pressure, and a temperature setting step of setting the second temperature as a temperature higher than the saturation temperature.

8. The steam turbine blade according to claim 3, wherein at least a portion of the heating wire is exposed from a bottom surface of the plurality of concave portions.

* * * * *